(12) United States Patent
Jacinto et al.

(10) Patent No.: US 10,638,335 B2
(45) Date of Patent: Apr. 28, 2020

(54) NETWORK BUILDS BASED ON CONGESTION, ACHIEVABLE PAYLOAD, AND USER THROUGHPUT

(71) Applicant: T-Mobile USA, Inc., Bellevue, WA (US)

(72) Inventors: Marie Grace Jacinto, Bellevue, WA (US); Ankur Kapoor, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 70 days.

(21) Appl. No.: 15/964,868

(22) Filed: Apr. 27, 2018

(65) Prior Publication Data

US 2019/0335342 A1    Oct. 31, 2019

(51) Int. Cl.
*H04W 4/00*      (2018.01)
*H04W 24/02*     (2009.01)
*H04W 28/02*     (2009.01)
*H04W 16/22*     (2009.01)
*H04W 24/08*     (2009.01)

(52) U.S. Cl.
CPC ........... *H04W 24/02* (2013.01); *H04W 16/22* (2013.01); *H04W 28/0289* (2013.01); *H04W 24/08* (2013.01)

(58) Field of Classification Search
None
See application file for complete search history.

(56) References Cited

U.S. PATENT DOCUMENTS

| 8,060,079 | B1 * | 11/2011 | Goyal | H04B 17/309 455/423 |
| 2014/0357285 | A1 * | 12/2014 | Smith | H04W 48/17 455/450 |
| 2018/0035346 | A1 * | 2/2018 | Fujishiro | H04W 16/32 |

* cited by examiner

*Primary Examiner* — Zewdu A Beyen
(74) *Attorney, Agent, or Firm* — Lee & Hayes, P.C.

(57) ABSTRACT

The methods, systems, and computer readable media discussed herein are directed to determining a capacity of a network having solutions from available network options for meeting an expected demand increase for the network. Performance parameters, such as current traffic congestion level and current throughput level, may be evaluated based on the current network information of the network, and solutions, or builds, specific to the network may be obtained to maintain a given network quality level at the expected demand increase based on available network options specific to the network.

16 Claims, 3 Drawing Sheets

NETWORK BUILDS BASED ON CONGESTION, ACHIEVABLE PAYLOAD, AND USER THROUGHPUT

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

To accommodate the growth in subscribers and the increased demand for access and use of the networks, network expansion and builds, such as deployment of spectrum, cell site additions, and other solutions or tactics, are necessary to provide good user experience to customers or to meet the given payload or tonnage, i.e., GBs, with a given network quality level. Current congestion, achievable payload, and user throughput may be used to determine the performance of the existing network as a baseline. The requirements for an existing network, a potential partnership with a service provider having additional networks, and new products and services may change in network growth trajectory, and may necessitate a new determination in the network requirement.

The existing network, designed and built to meet particular requirements and demands at the time of the design, such as the cellular access technologies (2G, 3G, or 4G), capacity, cell site location, a number of network sectors, spectral efficiency schemes, etc., is likely different from other networks that are currently in operation. Because of the differences, available solutions for a given network to meet the new requirements may be different, or unique, compared to other networks, and common builds are not likely to be sufficient or possible. Therefore, specific build options need to be determined.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
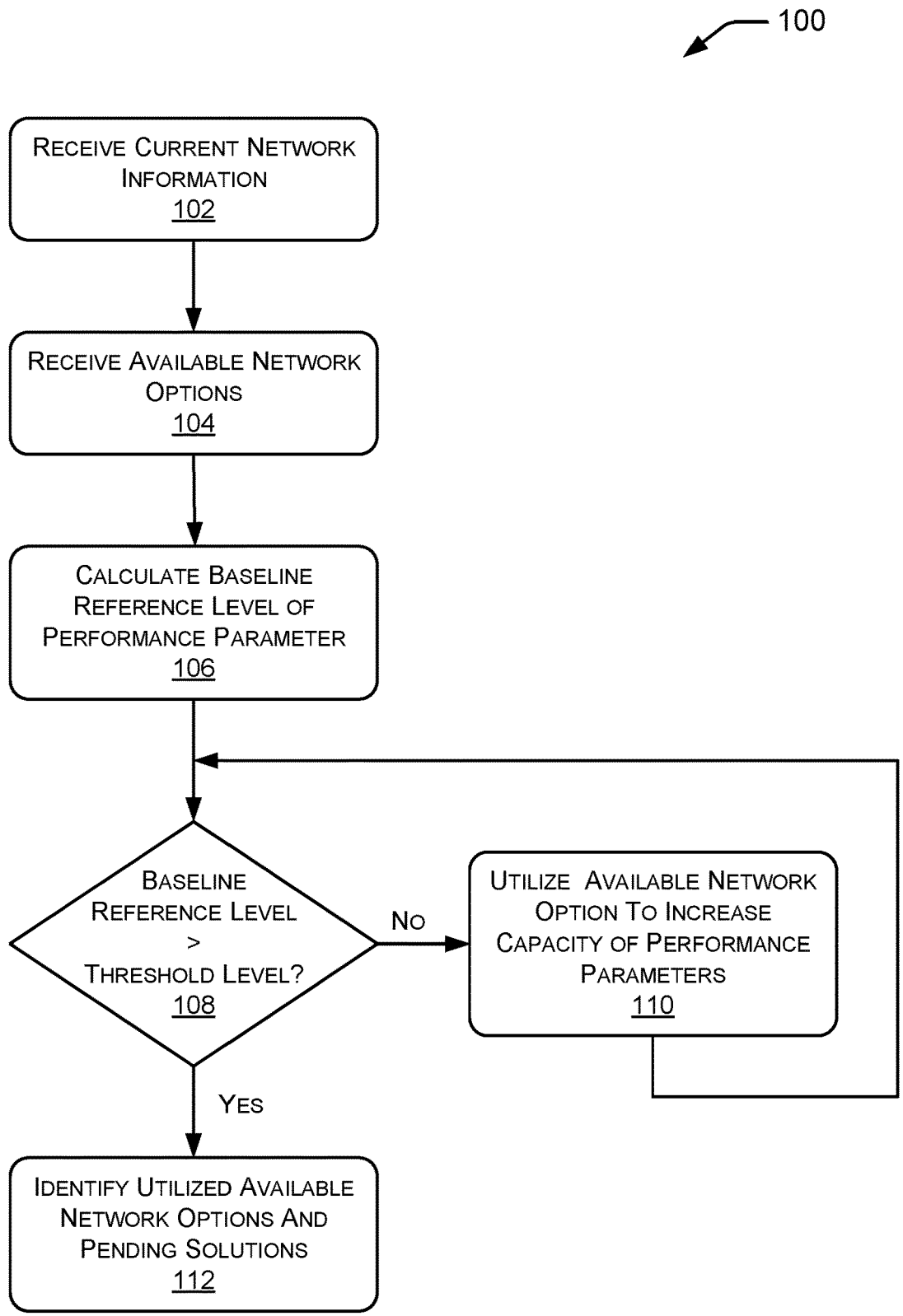
FIG. 1 illustrates an example process for determining builds to meet a desired capacity for traffic congestion of a sector of a network.

The methods, systems, and computer readable media discussed herein are directed to determining a capacity of a network, and more specifically to determining solutions from available network options for meeting an expected demand increase. The process, or model, described herein provides tailored solutions, i.e., more efficient and appropriate than a general solution, for a given network to meet an expected demand increase for the given network.

Performance parameters evaluated for determining the solutions may include traffic congestions and throughput of a network and sectors of the network, and the solutions, or builds, may be obtained to maintain a given network quality level at the expected demand increase. A process, or model, for the network and the sectors of the network may be utilized to determine builds to increase the capacity to relieve the traffic congestions and to determine builds to meet a user throughput target by increasing the capacity at a specific number of sectors or networks.

Inputs to the model may include current network information of the network and/or the sectors of the network and available network options of the network and/or the sectors of the network. The model may then calculate a baseline reference level of a performance parameter, such as a baseline user per a given bandwidth, such as 5 MHz, based on the current network information, and compare the baseline reference level to a threshold level provided in the current network information, such as a congestion threshold level, for each sector of the network. If the baseline reference level is greater than the threshold, then the model may proceed to add available network options in a certain sequence to increase the capacity of the network until the baseline reference level is no longer greater than the threshold. For example, the model may add capacity, or builds, by deploying available spectrum, add small cells, and split sectors by adding sectors or cells in that order.

The model may also determine builds based on a user throughput target. Each sector of the network may be ranked based on a corresponding sector weight and a corresponding baseline throughput, which may be provided based on a measured throughput or a multiple of Radio Access Network (RAN) throughputs. A number (N) of the sectors may then be selected in a descending ranking order, i.e., starting from the highest ranking, till an aggregated throughput of the selected sectors meets the target throughput. The model may then proceed to add to the selected N sectors remaining available spectrum, and may further add small cells or split the sectors based on the types of sectors.

Based on the results from the above, the model may further extrapolate an expected future performance, such as an expected throughput for each sector, based on additional network information associated with predicted, or expected, performance parameters for a specific time. For example, the additional performance parameters may include a 5-year projection, such as user growth, technology improvements, additional spectrum allocations, an expected traffic increase, and the like. The model may also calculate a distribution of throughput over a predetermined number of channel quality indicators (CQIs).

The methods, systems, and computer readable media described herein can be implemented in a number of ways. Example implementations are provided below with reference to the following figures.

FIG. 1 illustrates an example process 100 for determining builds to meet a desired capacity of a sector of a network. In this example, the capacity being considered is regarding the congestion level of the network.

At block 102, current network information of the network and each sector of the network may be received. The current network information may include location information, for example, a region and metropolitan statistical area (MSA) such as Los Angeles and New York, a Node B identification (ID), sector IDs, a Node B vendor, a baseline user forecast for a specific time frame such as a target year that is five years from the present time, planned spectrum for the target year, boundary definitions of the sectors such as core sectors, predetermined bit-rate polygons, and small cell polygons, inter-site distance (ISD), a congestion threshold, a proportional usage of the network by an associated secondary network, pending solutions, spectral efficiency gain factors, and a traffic ratio increment, and the like. One or more of the current network information of the network may be received automatically.

The pending solutions may include pending capacity mitigation plans (CMPs) having a value 1, 1.4, or 1.96, and pending long range plans (LRPs), including an active antenna system (AAS) and sector adds, having a value 1 or 1.4, and sector and cell additions having a value between 1 and 2.744 (multiples of 1.4). The spectral efficiency gain factors may include a multiple in multiple out (MIMO) antenna system, such as a 4×4 MIMO, licensed spectrum assisted access (LAA), AAS, coordinated multipoint (CoMP), enhanced voice service (EVS), 5G spectrum allocations, where each spectral efficiency gain factor has a corresponding gain percentage and corresponding handset penetration percentage with the overall sector gain being the product of the two. The traffic ratio increment may scale the baseline user load to simulated higher network load.

At block 104, available network options of the sectors may be received. The available network options of the sectors may include, for each sector, remaining spectrum opportunities, a small cell addition, and a sector and cell addition. The remaining spectrum opportunities may include unused radio frequency spectra available for a corresponding sector of the network which may be utilized to increase network or sector capacity, such as L19/L21 overlay, L700 overlay, AWS3 overlay, and L600 overlay. The small cell addition may be available for a sector that is in a small cell polygon as defined in the boundary definitions. Regarding the sector and cell addition, a new sector, or a new cell, may be added based on the capacity of the corresponding sector after other available network options have been utilized.

Although the current network information of the network and each sector and the available network options of the sectors have been illustrated to be received in separate blocks, they may be received in a single step, or block, as input entries, some of which may be received automatically.

At block 106, a baseline reference level of a performance parameter of each sector is calculated based on the current network information from block 102. In this example, the baseline reference level is a current congestion level of a corresponding sector, which may be evaluated based on the number of users per a preselected bandwidth, such as 5 MHz. The baseline reference level, or the baseline users per 5 MHz, may be calculated as:

Baseline users per 5 MHz=(Baseline user forecast)×
(Traffic ratio increment)/((Planned spectrum)/5)/
(Spectral efficiency gain factor)/(Pending CMP)/
(Pending LRP).

At block 108, the baseline reference level, or the baseline users per 5 MHz, may be compared to the threshold level. If the baseline reference level is determined to be greater than the threshold level, indicating that the congestion level is higher than the acceptable level, the process proceeds to block 110. At block 110, one of the available network options, based on a predetermined selection order, may be selected and utilized automatically upon determining that the baseline reference level is greater than the threshold level. The available network options may also include the pending solutions from the current network information. The predetermined selection order of the available network options and pending solutions may be to deploy available spectrum, add small cells, and then add a sector and cell. As a result, the capacity of the performance parameter, i.e., the capacity to handle traffic, of the corresponding sector may be increased in block 110.

The increased capacity for handling congestion from block 110 may be considered as a new threshold, and the process loops back to block 108 where the baseline reference level may be compared to the new threshold. If, in block 108, the baseline reference level is determined to be still greater than the new threshold, which is the increased capacity for handling congestion, another option from remaining options of the available network options may be utilized in block 110 to further increase the capacity for handling congestion of the corresponding sector. The baseline reference level may then be compared to the new threshold in block 108. The looping process of blocks 108 and 110 may be repeated until the baseline reference level is determined to be no longer greater than the increased capacity of the performance parameter, i.e., the new increased capacity for handling congestion. The process may then proceed to block 112, where the utilized available network options of the available network options for the corresponding sector may be identified. The utilization of the available network options in block 110 is further described below in the predetermined selection order.

As described above, the available spectrum for each sector may be deployed first. Incremental spectrum overlays for each sector in each band may be deployed as follows. If a sector is determined to be congested in block 108, then all available L19/21 and L700 spectrum may be deployed in block 110, and the congestion level of each sector may then be recalculated. The recalculated congestion level may be compared to the baseline reference level and whether each sector is still congested given the additional spectrum deployed above may be determined in block 108. If the sector is still determined to be congested, then all available AWS3 spectrum may be deployed, and the congestion level may be recalculated and compared to the baseline reference level. If the sector is still determined to be congested after the deployment of the AWS3, then all available L600 spectrum may be deployed and congestion may be recalculated.

If the sector is still determined to be congested and the sector is in a small cell polygon as defined in the boundary definitions, then the small cell additions may be utilized. The number of incremental small cells to be added may be determined as:

Incremental small cells=Round((Users per 5 MHz/
Congestion threshold level)−1)/0.1).

For example, if the number of users per 5 MHz is 60 (after the prior steps have been implemented) and the congestion threshold level is 50, then 2 small cells may be added. The congestion level may then be recalculated and compared to the baseline reference level.

If the sector is still determined to be congested, then the sector and cell site additions, which may also be referred to as splits, may be utilized. Sector and cell site additions may be calculated at the cell site level. The cell site level results may then be mapped back to the corresponding sectors, i.e., if there are additions for cell site "XXX," then those additions are applied to all sectors for that site (sectors XXX1, XXX2, etc.).

For each cell site, the number of remaining congested sectors (after the prior steps) may be determined. In addition, the amount of extra load, i.e., the number of users above the congestion threshold level, of each sector, which may be calculated in block 108 as a part of the comparison, may be summed across the sectors that are congested at each site. If there is only one congested sector at a given cell site and the amount of "extra" load of that sector can be solved by one sector split, then a sector addition may be utilized as the solution. For example, each sector addition may effectively increase the capacity by 40%, that is the number of users is divided by 1.4 for the purposes of determining whether the congestion threshold is reached. If the number of users is 50 and the threshold is 40, then one sector split is sufficient, i.e., 50/1.4=35.7<40. On the other hand, if the number of users is 60, then one sector addition is not sufficient because 60/1.4=42.9>40. Equivalently, if the amount of extra load, as calculated and discussed above, is determined to be less than or equal to 0.40, then the addition of one sector would be sufficient.

If two or more sectors are determined to be congested or the amount of extra load exceeds 40% of the congestion threshold level, then cell site addition may be utilized to solve the congestion. For example, similar to the sector split described above, each cell site addition may increase the capacity by 40%, that is the number of users is divided by 1.4 for the purposes of determining whether the congestion threshold is reached. The number of additional cell sites needed may be calculated by rounding up the ratio of the extra load to the capacity increase. For example, if the number of users is 60 and the threshold is 40, then the percentage extra load is (60−40)/40=0.5 or 50%, and roundup (0.50/0.4)=2. Therefore, two cell sites are added to meet the extra load.

Figure 2:
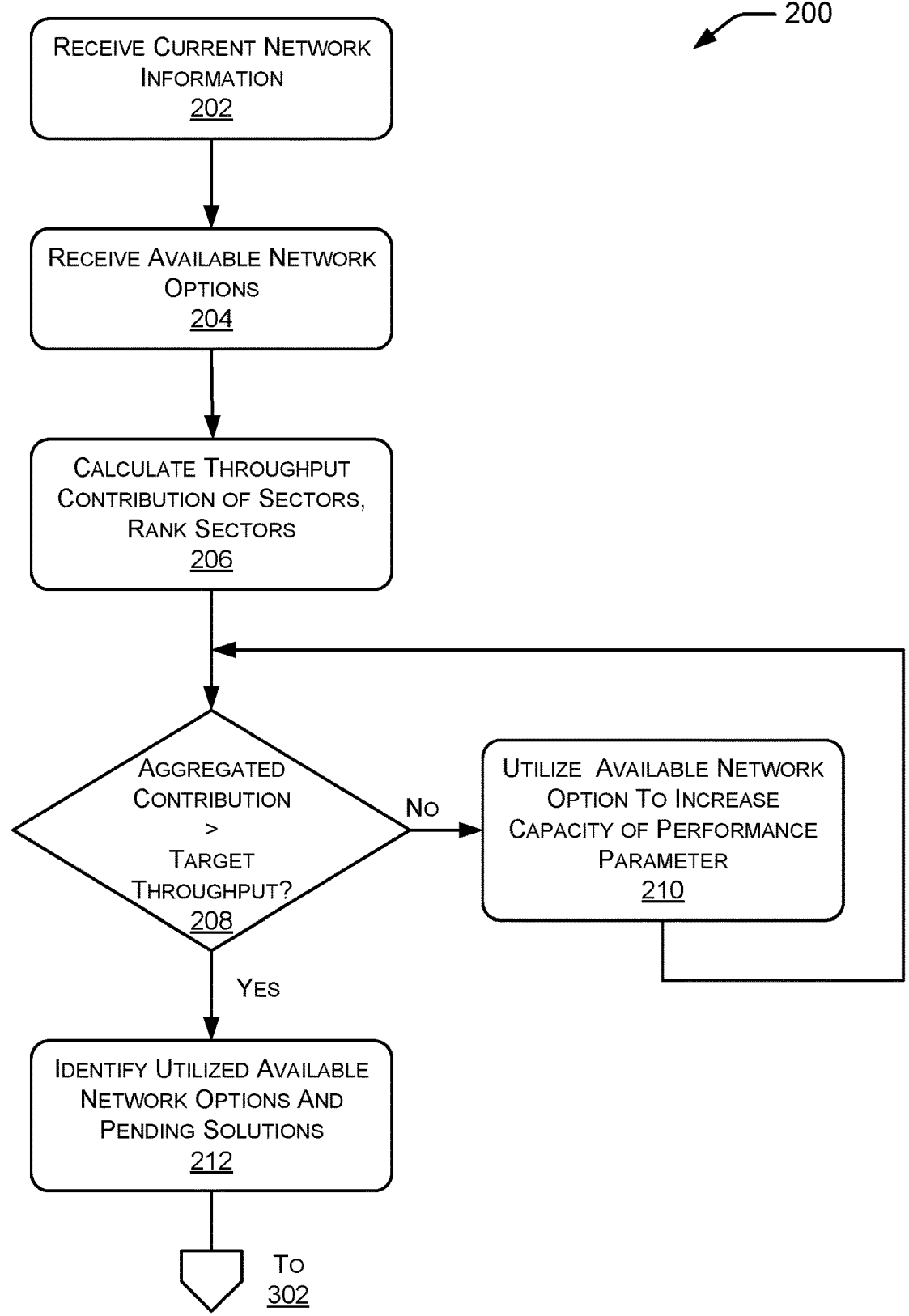
FIG. 2 illustrates an example process for determining builds to meet a desired capacity for throughput of a sector of a network.

FIG. 2 illustrates an example process 200 for determining builds to meet a desired capacity for throughput of a sector of a network.

Similar to the process described in FIG. 1, at block 202, current network information of the network and each sector of the network may be received. One or more of the current network information of the network may be received automatically. The current network information may include location information, for example, a region and metropolitan statistical area (MSA) such as Los Angeles and New York, a Node B identification (ID), sector IDs, a Node B vendor, a baseline user forecast for a specific time frame such as a target year that is five years from the present time, planned spectrum for the target year, boundary definitions of the sectors such as core sectors, predetermined bit-rate polygons, and small cell polygons, inter-site distance (ISD), a congestion threshold, a proportional usage of the network by an associated secondary network, pending solutions, spectral efficiency gain factors, and a traffic ratio increment, and the like. In addition, a respective sector weight, a baseline average throughput value, and/or a target throughput value may be received. The baseline average throughput value may be a measured throughput or a multiple of Radio Access Network (RAN) throughputs.

The pending solutions may include pending capacity mitigation plans (CMPs) having a value 1, 1.4, or 1.96, and pending long range plans (LRPs), including an active antenna system (AAS) and sector adds, having a value 1 or 1.4, and sector and cell additions having a value between 1 and 2.744 (multiples of 1.4). The spectral efficiency gain factors may include a multiple in multiple out (MIMO) antenna system, such as a 4×4 MIMO, licensed spectrum assisted access (LAA), AAS, coordinated multipoint (CoMP), enhanced voice service (EVS), 5G spectrum allocations, where each spectral efficiency gain factor has a corresponding gain percentage and corresponding handset penetration percentage with the overall sector gain being the product of the two. The traffic ratio increment may scale the baseline user load to simulated higher network load.

Similar to the process described in FIG. 1, at block 204, available network options of the sectors may be received. The available network options of the sectors may include, for each sector, remaining spectrum opportunities, a small cell addition, and a sector and cell addition. The remaining spectrum opportunities may include unused radio frequency spectra available for a corresponding sector of the network which may be utilized to increase network or sector capacity, such as L19/L21 overlay, L700 overlay, AWS3 overlay, and L600 overlay. The small cell addition may be available for a sector that is in a small cell polygon as defined in the boundary definitions. Regarding the sector and cell addition, a new sector, or a new cell, may be added based on the capacity of the corresponding sector after other available network options have been utilized.

Although the current network information of the network and each sector and the available network options of the sectors have been illustrated to be received in separate blocks, they may be received in a single step, or block, as input entries, some of which may be received automatically.

At block 206, a baseline reference level of a performance parameter of each sector is calculated. In this example, the baseline reference level is a respective current throughput contribution, such as a number of users, which may be based on the respective sector weight and the baseline throughput value. The sectors of the network may then be ranked based on a respective throughput contribution.

At block 208, the baseline reference level is compared to the threshold level by aggregating a number, initially preselected, of the respective current throughput contribution of the respective sector from a highest ranking sector of the plurality of sectors in a descending order and comparing the aggregated throughput contributions to the target throughput value. If the aggregated throughput contribution is determined to be less than the target throughput value, then, in block 210, solutions from the available network options may be utilized for the sectors associated with the aggregated throughput contribution. The available network options may also include the pending solutions from the current network information, some of which may be utilized automatically upon determining that the aggregated throughput contribution is less than the target throughput value. The sectors associated with the aggregated throughput contribution may first receive all corresponding remaining available spectrum. If an associated sector is in a small cell polygon as defined in the boundary definitions, then the small cell additions may be utilized. If the associated cell is not in a small cell polygon, then the sector and cell site additions, which may also be referred as splits, may be utilized.

Based on the utilized solutions in block 210, an increased capacity of the performance parameter, i.e., a revised throughput of each sector, may also be calculated at block 210. The revised throughput may be calculated based on the throughput being considered linear with the spectrum, each small cell adding 0.1 or 10% capacity, such that eight additional small cells would result in the throughput being multiplied by 1.8, and each sector/cell split adds 0.4 or 40% capacity such that the throughput would be multiplied by 1.4. The weighted-average throughput is then calculated using the sector weights, and the number for aggregating the throughput contribution is also adjusted, adding or removing a sector(s), at block 210, for recalculating the aggregated throughput contribution. The recalculated aggregated throughput contribution is compared to the target throughput at block 208. The process of adjusting the number of sectors for the aggregated throughput contribution and comparing the aggregated throughput contribution to the target throughput may be repeated until the aggregated throughput contribution is no longer greater that the target throughput. The process may then proceed to block 212, where the utilized available network options of the available network options and pending solutions and the respective sectors associated with the aggregated throughput contribution may be identified.

Figures 3, 4:
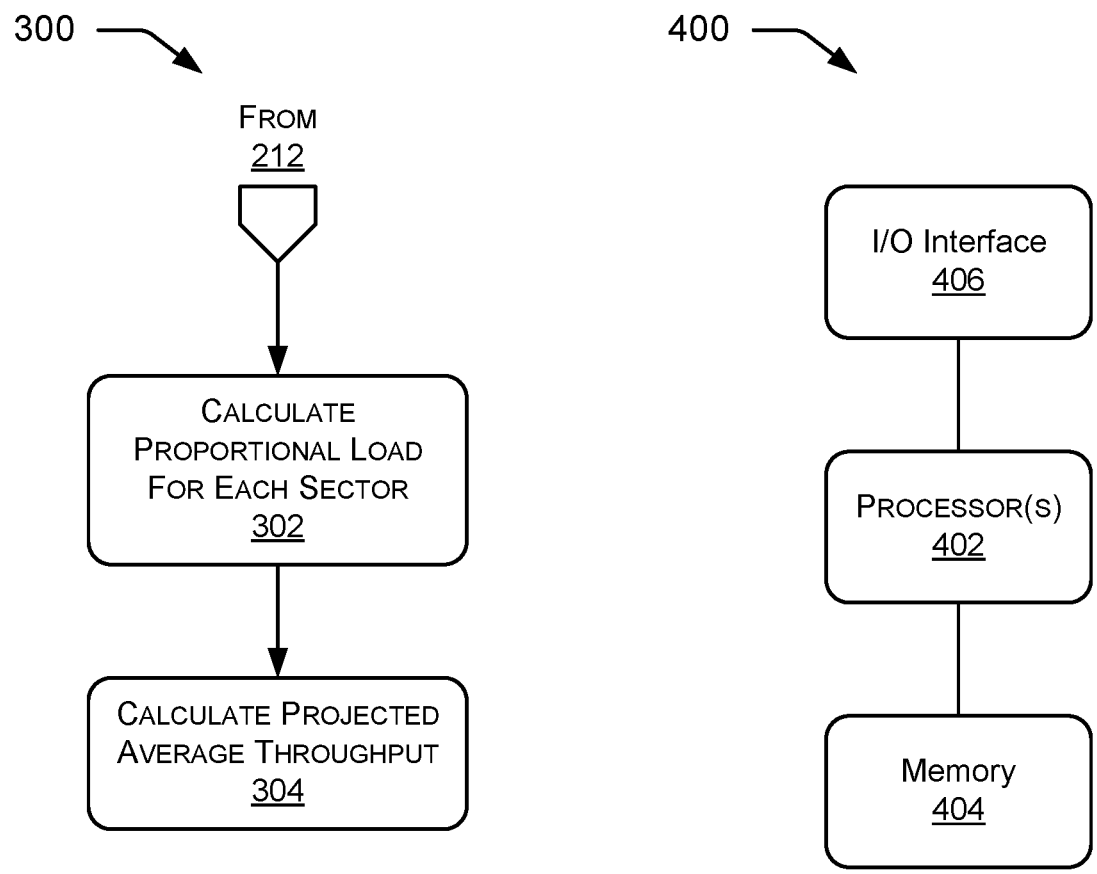
FIG. 3 illustrates an example process for determining a throughput of a sector having the builds determined in the process described in FIG. 2.
FIG. 4 illustrates an example block diagram of a system for determining the capacity of each sector of the plurality of sectors of the network.

FIG. 3 illustrates an example process 300 for determining a throughput of a sector having the builds determined in the process 200.

In this process, the current network information of the respective sector, as discussed above with reference to block 202 of FIG. 2, may further include a previously deployed spectrum, which may include a spectrum currently in use, a projected growth factor, a loading factor, and a use distribution of a predetermined number of channel quality indicator (CQI) intervals, for example, 15 CQI intervals or buckets.

At block 302, based on the number of users in each sector of the network as determined at 206, a corresponding proportion of the number of users of each sector of the plurality of sectors of the network may be calculated. That is, a proportional load, such as a percentage of the total throughput, may be calculated for each sector. At block 304, a projected average throughput for the specific time frame, such as five years from the present time, of each sector of the plurality of sectors of the network may be calculated based on the current network information of the respective sector.

The projected average throughput of each sector for the specific time frame may be calculated by adjusting baseline average throughput value, such as the measured throughput of each sector as currently configured, based on (a) spectral efficiency gains, i.e., technology improvements, (b) deployment of additional spectrum, (c) builds, both planned and incremental as determined in the processes illustrated with reference to FIGS. 1 and 2, and (d) load, or tonnage. The projected average throughput may be calculated as:

Projected average throughput=(Baseline average throughput value)×(Spectral efficiency gain factor)×((planned spectrum)/(previously deployed spectrum))×(Pending CMP)×(Pending LRP)×(Incremental Gain)×(1/(Projected growth factor))×(1/(Traffic ratio increment))

The spectral efficiency gain factor for each sector may be calculated as a product of the components discussed above with reference to block 102, as (1+G1)×(1+G2) ... ×(1+Gn), where G1, G2, Gn are corresponding gain factor associated with each component of n components. Some components may be applicable to all sectors (e.g., 4×4 MIMO) while others may be only applicable to small cell polygon sectors (e.g., LAA). The overall spectral efficiency gain factor for each sector may then be calculated from the components applicable to each sector. A weighted-average national throughput may then be calculated from the sector level results, weighting by the proportional load for each sector as illustrated with reference to block 302.

The distribution of projected average throughput in each sector may be determined based on the 3GPP standard CQI table, such as the CQI table described in 3GPP TS 36.213, and be divided into 15 CQI buckets with the distribution being approximately linear from 6 Mbps to 200 Mbps. For each sector, the projected average throughput distributed over the 15 CQI buckets above may be scaled to match the average throughput for the sector. Thus, for example, while the projected average throughput may vary from 6 to 200 Mbps, the scaled distribution for an individual sector may vary from 2 to 60 Mbps.

The distribution for each sector in the 15 CQI buckets may then be translated to a standard throughput level threshold that are used in the charging data functions (CDFs). The standard Throughput levels may be 1, 2, 3, 4, 5, 10, 15, . . . , 100, having increments of 5 Mbps in the higher portion of the range. This translation may be performed based on: (a) the distribution of time in each bucket (input) and (b) the scaled throughputs for each bucket, resulting in a CDF for each sector, i.e., the throughput may be in bucket 1 x % of time, in bucket 2 y % of time, etc. These individual sector CDFs may then be aggregated to an overall national CDF using the same weighting as used for the averages.

FIG. 4 illustrates an example block diagram of a system 400 for determining the capacity of each sector of the plurality of sectors of the network. The system 400 may comprise one or more processors 402, memory 404 coupled to the one or more processors 402, and an Input/Output (I/O) Interface 406 coupled to the one or more processors 402.

In some embodiments, the one or more processors 402 may be a central processing unit (CPU), a graphics processing unit (GPU), or both CPU and GPU, or other processing unit or component known in the art. Memory 404 may include volatile memory (such as random access memory (RAM)) and/or non-volatile memory (such as read-only memory (ROM), flash memory, etc.). Memory 404 may also include additional removable storage and/or non-removable storage including, but not limited to, flash memory, magnetic storage, optical storage, and/or tape storage that may provide non-volatile storage of computer-readable instructions, data structures, program modules, and other data for the system 400. The I/O interface 406 may include a keyboard, mouse, touch pad, touch screen, microphone, and the like, configured to receive information from a user, such as current network information of the sectors and available network options of the sectors, and may also include a speaker, display which may be a touchscreen, and the like, configured to provide an output for the user, such as the builds identifying the utilized available network options for the sectors of the network.

Memory 404, a non-transitory computer storage medium, may store computer-readable instructions executable by the one or more processors 402, that when executed by the one or more processors 402, cause the one or more processors 402 to perform operations described above with referenced to FIGS. 1, 2, and 3. For example, the one or more processors 402 may receive, via the I/O Interface 406, current network information of each sector of the network and available network options of each sector as discussed above with reference to blocks 102, 104, 202, and 204. The one or more processors 402 may then calculate a baseline reference level of a performance parameter, such as a congestion level or a throughput level, of each sector based on the current network information, and determine whether the baseline reference level is greater than a threshold level of the performance parameter as discussed above with reference to blocks 106, 108, 206, and 208. Upon determining that the baseline reference level is greater than the threshold level, the one or more processors 402 may utilize one of the available network options, and increase a capacity of the performance parameter of the sector as discussed above with reference to blocks 110 and 210.

The one or more processors 402 may then determine whether the baseline reference level is still greater than the increased capacity of the performance parameter of the sector. If the baseline reference level is determined to be greater than the increased capacity of the performance parameter of the respective sector, the one or more processors 402 may utilize remaining available network options of the available network options and the pending solutions in a predetermined order to increase the capacity, as discussed above with reference to blocks 110 and 210, until the respective baseline reference level is no longer greater determined to be than the increased capacity of the performance parameter as discussed above with reference to blocks 108 and 208. The one or more processors 402 may then identify the utilized available network options of the available network options.

As discussed above with reference to block 208, the one or more processors 402 may rank the plurality of sectors of the network based on corresponding throughput contributions, where the corresponding throughput contribution is calculated based on the sector weight and the baseline throughput value of the corresponding sector. The one or more processors 402 may aggregate a preselected number the throughput contributions of the sectors from a highest ranking sector in a descending order until the aggregated throughput contribution is determined to be greater than the target throughput value as discussed above with reference to blocks 208 and 210. The one or more processors 402 may then identify the sectors associated with the aggregated throughput contribution as discussed above with reference to block 212. The one or more processors 402 may then calculate a proportion of the number of users in each sector of the network, and calculate a projected average throughput of each sector based on the current network information of each sector as discussed above with reference to blocks 302 and 304.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Memory 404, discussed above with referenced to FIG. 4, is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 1, 2, and 3. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for determining a capacity of a respective sector of a plurality of sectors of a network, the method comprising:
   receiving current network information of the respective sector, the current network information including a respective sector weight, a target throughput value, and a baseline throughput value;
   receiving available network options of the respective sector;
   calculating a respective baseline reference level of a performance parameter of the respective sector based on the current network information, wherein the calculating includes ranking the plurality of sectors of the network based on a respective current throughput contribution, the respective current throughput contribution being based on the respective sector weight and the baseline throughput value;
   determining whether the respective baseline reference level is greater than a threshold level of the performance parameter, wherein the determining includes:
     aggregating a preselected number of the respective current throughput contribution of the respective sector from a highest-ranking sector of the plurality of sectors in a descending order, and
identifying the respective sectors associated with the aggregated throughput contribution; and
upon determining that the respective baseline reference level is greater than the threshold level, automatically utilizing one of the available network options to increase a capacity of the performance parameter of the respective sector.

2. The method of claim 1, wherein the current network information of the respective sector includes:
location information of the network,
identification information of the network,
a baseline user forecast for a specific time frame for the network,
spectrum deployed for the specific time frame,
boundary definitions,
inter-site distance (ISD) relative to the network,
the threshold level of the performance parameter,
a proportional usage of the network by an associated secondary network,
pending solutions,
spectral efficiency gain factors, and
a traffic ratio increment,
wherein at least one of the current network information is received automatically.

3. The method of claim 2, wherein the available network options of the respective sector include:
remaining spectrum opportunities;
a small cell addition; and
a sector and cell addition.

4. The method of claim 3, wherein calculating the respective baseline reference level of the performance parameter of the respective sector based on the current network information includes calculating a number of users per a preselected bandwidth.

5. The method of claim 4, further comprising:
determining whether the respective baseline reference level is greater than the increased capacity of the performance parameter of the respective sector; and
upon determining that the respective baseline reference level is greater than the increased capacity of the performance parameter of the respective sector, utilizing remaining available network options of the available network options in a predetermined order to increase the capacity till the respective baseline reference level is no longer greater than the increased capacity of the performance parameter.

6. The method of claim 5, further comprising:
identifying the utilized available network options of the available network options upon determining that the respective baseline reference level is no longer greater than the increased capacity of the performance parameter.

7. The method of claim 6, wherein the performance parameter is a network congestion measurement.

8. The method of claim 1, wherein increasing the capacity of the performance parameter of the respective sector comprises:
iteratively adjusting the preselected number of the respective current throughput contribution of the respective sector until the aggregated throughput contribution is greater than the target throughput value.

9. The method of claim 1, further comprising:
calculating a corresponding proportion of a number of users in each sector of the plurality of sectors of the network,
wherein the current network information of the respective sector further includes:
a previously deployed spectrum,
a projected growth factor,
a loading factor, and
a use distribution of a predetermined number of channel quality indicator (CQI) intervals.

10. The method of claim 9, further comprising:
calculating a projected average throughput of each sector of the plurality of sectors of the network based on the current network information of the respective sector.

11. A system for determining a capacity of a respective sector of a plurality of sectors of a network, the system comprising:
one or more processors;
memory coupled to the one or more processors, the memory storing computer-readable instructions executable by the one or more processors, that when executed by the one or more processors, cause the one or more processors to perform operations comprising:
receiving current network information of the respective sector including pending solutions, the current network information further including a respective sector weight and a baseline throughput value, wherein the current network information of the respective sector further includes:
a previously deployed spectrum,
a projected growth factor,
a loading factor, and
a use distribution of a predetermined number of channel quality indicator (CQI) intervals;
receiving available network options of the respective sector;
calculating a corresponding proportion of the number of users in each sector of the plurality of sectors of the network;
calculating a projected average throughput of each sector of the plurality of sectors of the network based on the current network information of the respective sector:
calculating a respective baseline reference level of a performance parameter of the respective sector based on the current network information, wherein the calculating includes ranking the plurality of sectors of the network based on a respective current throughput contribution, the respective current throughput contribution being based on the respective sector weight and the baseline throughput value;
determining whether the respective baseline reference level is greater than a threshold level of the performance parameter; and
upon determining that the respective baseline reference level is greater than the threshold level, automatically utilizing one of the available network options to increase a capacity of the performance parameter of the respective sector.

12. The system of claim 11, wherein the operations further comprise:
determining whether the respective baseline reference level is greater than the increased capacity of the performance parameter of the respective sector;
upon determining that the respective baseline reference level is greater than the increased capacity of the performance parameter of the respective sector, utilizing remaining available network options of the available network options in a predetermined order to increase the capacity till the respective baseline reference level is no longer greater than the increased capacity of the performance parameter; and identifying the utilized available network options of the available network options upon determining that the respective baseline reference level is no longer greater than the increased capacity of the performance parameter.

13. The system of claim 11, wherein
the current network information of the network includes a target throughput value, and
calculating the respective baseline reference level of the performance parameter of the respective sector based on the current network information further includes:
  aggregating a preselected number of the respective throughput contributions of the respective sectors from a highest-ranking sector of the plurality of sectors in a descending order until the aggregated throughput contribution is greater than the target throughput value; and
  identifying the respective sectors associated with the aggregated throughput contribution.

14. A non-transitory computer storage medium configured to store computer-readable instructions by a computer, that when executed, cause the computer to perform operations comprising:
  receiving current network information of a respective sector of a plurality of sectors of a network including pending solutions, the current network information further including a respective sector weight, a target throughput value, and a baseline throughput value;
  receiving available network options of the respective sector;
  calculating a respective baseline reference level of a performance parameter of the respective sector based on the current network information, wherein the calculating includes:
    aggregating a preselected number of the respective throughput contribution of the respective sector from a highest-ranking sector of the plurality of sectors in a descending order until the aggregated throughput contribution is greater than the target throughput value, the respective throughput contribution being based on the respective sector weight and the baseline throughput value, and
    identifying the respective sectors associated with the aggregated throughput contribution;
  determining whether the respective baseline reference level is greater than a threshold level of the performance parameter; and
  upon determining that the respective baseline reference level is greater than the threshold level:
    automatically utilizing one of the available network options to increase a capacity of the performance parameter of the respective sector.

15. The non-transitory computer storage medium of claim 14, wherein the operations further comprise:
  determining whether the respective baseline reference level is greater than the increased capacity of the performance parameter of the respective sector;
  upon determining that the respective baseline reference level is greater than the increased capacity of the performance parameter of the respective sector, utilizing remaining available network options of the available network options in a predetermined order to increase the capacity till the respective baseline reference level is no longer greater than the increased capacity of the performance parameter; and
  identifying the utilized available network options of the available network options upon determining that the respective baseline reference level is no longer greater than the increased capacity of the performance parameter.

16. The non-transitory computer storage medium of claim 14,
wherein the current network information of the respective sector further includes:
  a previously deployed spectrum,
  a projected growth factor,
  a loading factor, and
  a use distribution of a predetermined number of channel quality indicator (CQI) intervals, and
wherein the operations further comprise:
  calculating a corresponding proportion of the number of users in each sector of the plurality of sectors of the network; and
  calculating a projected average throughput of each sector of the plurality of sectors of the network based on the current network information of the respective sector.

* * * * *